United States Patent Office 2,861,891
Patented Nov. 25, 1958

2,861,891
WATER DISPERSIBLE CAROTENOID COMPOSITIONS AND PROCESS OF MAKING THE SAME

Jacob Christopher Bauernfeind and Raymond Howard Bunnell, Pompton Plains, N. J., assignors to Hoffmann-La Roche Inc., Nutley, N. J., a corporation of New Jersey No Drawing. Application December 13, 1956
Serial No. 627,996

17 Claims. (Cl. 99—148)

This invention relates to water dispersible carotenoid compositions and to a method for preparing such compositions. More particularly the invention relates to dry carotenoid compositions which are stable to air and moisture and which may be dispersed in aqueous media.

Carotenoids are yellow to red pigments of aliphatic or alicyclic structure containing numerous conjugated carbon to carbon double bonds, for example, carotene, lycopene, bixin, zeaxanthin, cryptoxanthin, lutein and esters of hydroxyl or carboxyl containing members of the group. Members of the class are widely distributed in the animal and vegetable kingdoms. These pigments are potentially useful as coloring agents for food preparations to provide a natural appearance and are particularly of interest as substitutes for artificial dyes. The carotenoids have not, however, reached their full potential because they do not dissolve or disperse readily. In solid materials the crystalline substances have a tendency to speckle; in liquid preparations they tend to rapidly settle out. Because of the limited solubility of the carotenoids in most edible solvents and inability to disperse these substances in aqueous media, the use of solutions has not heretofore solved the problem. Particularly in aqueous base products such as juices, beverages, ice cream, etc., and dry products which are reconstituted or processed with water before use, such as dry cake mixes, dry beverage bases, gelatin desserts, etc., the water insolubility of the carotenoids prevents the utilization of the natural coloring agents.

Though the carotenoids are generally characterized as oil soluble, their solubility is of such a low order at ordinary temperatures so as not to attain a practical level. For example, the most commonly used substance, $\beta$-carotene, has a solubility of about 0.08% by weight in vegetable oils at room temperature. Supersaturated solutions of the carotenoids in edible oils such as vegetable oils which are liquid at about room temperature may be prepared by heating the oil to elevated temperatures. These solutions, however, are unstable and normally the carotenoid soon crystallizes out, particularly upon cooling.

It is an object of this invention to prepare coloring agents in dry form which are stable and which impart a uniform color to dry, particulate products in which they are distributed or to such dry particulate products upon reconstitution with water. More particularly, it is an object of this invention to provide carotenoid compositions useful as coloring agents which are water dispersible. It is also an object of this invention to provide a stable form of carotene, particularly for use in dry form.

It has been found that compositions which contain high concentrations of carotenoids and which are water dispersible may be prepared by first forming a supersaturated solution of a carotenoid in an edible oil having the characteristics described below at elevated temperature. This supersaturated carotenoid solution may be conserved for use at normal temperatures without crystallization of the pigment in contrast to normal experience by emulsifying the warm oil solution in a gelatinous material such as a water soluble gum or gelable colloid solution and converting the emulsion thus formed into a dry particulate form, for example, beadlets, powder, etc. The emulsion may be set in a dry form, e. g., by spray drying or by spraying the emulsion in fine droplets into a dry collecting powder.

The dry beadlet or powder produced in this manner may be readily dispersed in a dry mix and/or in aqueous solution without crystallization, speckling or settling of the carotenoid pigment. They may be used as coloring agents for dry food preparations which are to be reconstituted or processed with water before they are served such as dry cake mixes, dry beverage bases, gelatin desserts, etc. For example, the dry powder will provide a uniform yellow or golden color to a dry cake mix and this color is carried through the mixing and baking process into the finished cake. Similarly the products of this invention make possible the coloring of aqueous base food products such as juices, beverages, ice cream, etc., by dispersing the dry preparation in the aqueous liquid without crystallization or settling of the pigment.

The carotenoids which are particularly adapted for use according to the present invention to produce water dispersible coloring agents include carotene, lycopene, bixin, methylbixin, ethylbixin, lutein, zeaxanthin and cryptoxanthin. The carotenoids in concentrated form impart colors of varying hue. By suitable dilution, however, they may be utilized to impart various shades in the range yellow to red. For example, $\beta$-carotene may be used to impart an orange or yellow color having the shade of oranges or the golden shade of butter.

The oils which may be used to produce dry, supersaturated water dispersible carotenoid compositions according to this invention are edible oils which are liquid at room temperature or slightly above room temperature, e. g. about 20° to 40° C., and in which the carotenoids are soluble to a substantial degree at elevated temperature, e. g. 100° to 160° C. These oils are preferably edible vegetable oils such as coconut oil, sesame oil, peanut oil, corn oil, cottonseed oil, soybean oil, etc. Of the vegetable oils, coconut oil is preferred. Other edible oils which may be used are lard and butter oil. Up to about 20% by weight of the carotenoid may be dissolved in the heated edible oil, but this limit varies somewhat for the respective carotenoids. For example, up to about 18% of carotene, the preferred carotenoid, dissolves in the oil. Seven to 17% of carotene produces optimum results.

Preservatives and antioxidants such as butylated hydroxytoluene, butylated hydroxyanisole, propyl gallate, tocopherols, ascorbyl palmitate, etc., may be added to the composition to further enhance the stability against deterioration by heat, air and moisture. Preferably these materials are introduced into the oil phase.

Water soluble gums and gelable colloids which may be used to form the continuous phase of the emulsion which stabilizes and fixes the carotene-in-oil solution include gelatin, pectin, gum arabic, polyvinyl pyrrolidone, etc. Preferably a plasticizer is dissolved in the gelable colloid to impart plasticity and resistance to mechanical damage in the finished product. Suitable plasticizers include sugars and sugar alcohols such as sucrose, glucose, sorbitol, mannitol, invert sugar, etc.

A more detailed description of the invention follows. The preferred components, gelatin, sugar (sucrose) and carotene, are referred to as illustrative, but the method may be applied to each of the carotenoids. All proportions are expressed as percent by weight of the immediate composition under discussion unless otherwise specified.

An aqueous solution of gelatin is heated to a temperature of about 60° to 100° C. The aqueous gelatin solution contains approximately 50% gelatin by weight.

Separately, a supersaturated solution of carotene is prepared by dissolving crystals of the pigment in an edible vegetable oil, coconut oil, for example, which has been heated to an elevated temperature within the range of about 100° to 160° C., preferably 135° to 145° C. The addition of the carotene is preferably effected in an inert atmosphere, e. g., under nitrogen or carbon dioxide. About 1 to 18% by weight of carotene may be dissolved in the oil phase. The warm solution of carotene-in-oil is then rapidly emulsified with the warm aqueous gelatin solution. The oil solution and the gelatin solution are combined in a ratio of about 1 part of the former to about 1 to 6 parts of the latter on a weight basis.

When the carotene-in-oil solution has been completely emulsified, a concentrated aqueous sugar solution, for example about a 50% solution, is added to the emulsion. The ratio of gelatin to sugar may be varied, but the ratio (on a solids basis) of carotene-oil to gelatin-sugar should be maintained in the range of about 1 to 2 to about 1 to 12. The finished emulsion is then diluted to spray viscosity, e. g. 20–40% solids, by the addition of water to the emulsion. The resulting emulsion comprising a supersaturated solution of carotene-in-oil dispersed in an aqueous gelatin-sugar phase is then converted to a dry, particulate form as described below.

The carotene bearing emulsion may be set in the form of a dry beadlet by converting the emulsion to fine droplets, e. g. by spraying through a rotating nozzle, and collecting the individual droplets in a mass of collecting powder in such a manner that the droplets are kept separate from each other until they set in a particulate form. The collecting powder into which droplets of the emulsion are sprayed preferably consists of starch or a chemically modified starch which is substantially insoluble in cold water, resistant to wetting by water, free flowing and has an appreciable capacity to absorb or adsorb water. It is important that the collecting powder have a moisture content below about 8% which can be attained by drying a commercially available starch or a chemically modified starch. A preferred collecting powder is a starch ester such as disclosed in U. S. Patent No. 2,613,206, a commercial embodiment thereof being available under the trade name "Dry-Flo," distributed by National Starch Products Inc., New York, N. Y. The carotene-in-oil dispersion in gelatin becomes set in beadlet form in the collecting powder and may be separated therefrom by screening. The carotene beadlets may be further dried, if desired, by heating in a drying oven.

Alternatively, the oil-gelatin emulsion described above may be set in the form of a fine dry powder by the spray drying technique. That is, the emulsion is sprayed in the form of a very fine droplets or mist, e. g. by spraying through a nozzle, into a chamber heated to a temperature in the range of about 60° to 90° C. The droplets fall through the heated chamber and are set in solid form. The composition collected from the base of the chamber comprises a dry, finely divided powder containing therein carotene-in-oil dispersed in gelatin.

Carotenoids such as carotene, for example, exist in more than one isomeric form. This invention may be applied to and encompasses the various isomeric forms of the carotenoids.

The following examples are illustrative of the invention. All temperatures are in degrees centigrade.

Example 1

1.20 grams of butylated hydroxytoluene and 0.12 gram of butylated hydroxyanisole were dissolved in 93.0 grams of coconut oil. The oil solution was heated to 140–145° C. under a nitrogen atmosphere. 7.0 grams of cis-β-carotene were dissolved in the warm oil. The solution was stirred and held at 140° C. for about 2 minutes and then cooled to 70–75° C. The oil solution was then emulsified in 100 grams of a 50% aqueous gelatin solution held at a temperature within the range 65–75° C. To the emulsion was added 250.0 grams of sucrose as a 50% solution in water and the emulsion was again stirred for a short time. Water was added to the emulsion to reach spray viscosity.

The emulsion was loaded into a reservoir connected to a revolving spray nozzle operating in a closed chamber. The emulsion passing through the spray nozzle by gravity was converted to fine droplets which fell to the bottom of the chamber into an agitated bed of "Dry-Flo" starch collecting powder. The beadlets which collected in the "Dry-Flo" were allowed to remain overnight and then separated from the starch powder by screening. The reddish beadlets were then further dried in a circulating air oven at 56° C. overnight.

The procedure described above was repeated substituting, however, 93.0 grams of lard for the same amount of coconut oil. Dry, carotene-containing beadlets similar to those obtained above were produced.

The foregoing procedure was repeated substituting 93.0 grams of butter oil for the same amount of coconut oil to obtain similar dry, carotene-containing beadlets.

0.2 gram of carotene in coconut oil-containing beadlets produced as described above were added with stirring to one quart of a citrus fruit drink commercially available under the name of "Hi-C". The fruit drink became orange-yellow in color. The beverage was processed in the conventional manner, i. e. pasteurized and canned. Upon re-opening of the can, the citrus fruit drink had the same orange-yellow color and retained the carotene content present before processing.

135 mg. of carotene in coconut oil-containing beadlets prepared as described above were mixed with 257.2 grams of commercially available, standard white cake mix. The beadlets were stirred into the cake mix. The mix was processed in the conventional manner to obtain a batter and then baked. The uniform golden-yellow color was retained throughout the processing and the finished cake showed the same coloring.

Example 2

0.85 gram of butylated hydroxytoluene and 0.085 gram of butylated hydroxyanisole were dissolved in 70 grams of coconut oil and the solution was heated to 140° C. 5.2 grams of cis-β-carotene were then dissolved in the solution while stirring under an atmosphere of carbon dioxide gas. The temperature was held at 140° C. for about 2 minutes and then allowed to cool to room temperature still maintaining the carbon dioxide atmosphere. The carotene-in-oil solution was mixed well with 300 g. of gum arabic in a mortar. 150 ml. of water were then added in portions, with good mixing, until an emulsion formed. An additional 550 ml. of water were added and the emulsion was well mixed with a high speed shear-type mixer.

The finished emulsion was then sprayed in a small Bowen spray drier with a spray chamber temperature of 77°–83° C. and a feed rate of 20–25 ml. per minute. The material collected from the spray drying chamber was an orange powder with a fine particle size.

Example 3

1.2 grams of butylated hydroxytoluene and 0.12 gram of butylated hydroxyanisole were dissolved in 93 grams of coconut oil and the solution was heated to 140–150° C. 7 grams of methylbixin (dimethyl ester of norbixin) were added with stirring under an atmosphere of carbon dioxide gas and the temperature was held at 140° C. for about 3 minutes. The oil solution was cooled to about 100–110° C. The oil solution was then emulsified in 225 grams of a 50% aqueous gelatin solution. When emulsification was complete, 112.5 grams of sucrose, as a 50% solution in water, were added and further emulsified. Adjustment to spray viscosity was made by the addition of water and the material was then sprayed into "Dry-Flo" collecting powder as described in Example 1.

*Example 4*

Lycopene-containing beadlets were produced by following the procedure described in Example 3 utilizing the following quantities of ingredients: 7 grams lycopene, 1.2 grams butylated hydroxytoluene, 0.12 gram butylated hydroxyanisole, 93 grams coconut oil, 300 grams 50% aqueous gelatin solution and 150 grams sucrose (as a 50% solution in water).

We claim:

1. A process for producing a dry, water dispersible carotenoid coloring composition which comprises dissolving a carotenoid in an edible oil which is liquid at a temperature of about 20° to about 40° C. and which has been heated to a temperature of about 100° to about 160° C., in an amount in excess of the solubility at room temperature of the carotenoid in the oil so as to form a supersaturated solution of the carotenoid in the oil, emulsifying while warm said supersaturated carotenoid solution in an aqueous gelable colloid solution and setting said emulsion in dry, particulate form.

2. A process as in claim 1 wherein the carotenoid is carotene.

3. A process as in claim 1 wherein the carotenoid is lycopene.

4. A process as in claim 1 wherein the carotenoid is bixin.

5. A process as in claim 1 wherein the carotenoid is methyl bixin.

6. A process as in claim 1 wherein the supersaturated solution of carotenoid-in-oil contains 1 to 20% by weight of carotenoid and the emulsion contains 1 to 6 parts of an aqueous gelable colloid for each part of carotenoid-in-oil solution on a weight basis.

7. A process for producing a dry, water dispersible carotene composition which comprises forming a supersaturated solution of carotene by dissolving 1 to 18% of carotene in an edible vegetable oil which is normally liquid at about room temperature and which has been heated to a temperature of about 100° to about 160° C., emulsifying while warm the supersaturated carotene-in-oil solution in an aqueous gelatin solution, spraying the emulsion in the form of fine droplets and setting said droplets in dry, particulate form.

8. In a process for producing a water dispersible carotenoid coloring composition the improvement which comprises dissolving the carotenoid in a liquid edible oil, which has been heated to a temperature of about 100° to about 160° C., in an amount in excess of the solubility at room temperature of the carotenoid in the oil so as to form a supersaturated solution of carotenoid in the oil and emulsifying while warm said supersaturated carotenoid solution in an aqueous gelable colloid solution.

9. A process as in claim 8 wherein the carotenoid is carotene.

10. A process which comprises dissolving 7 to 17% by weight of carotene in an edible vegetable oil which is liquid at about room temperature and which has been heated to a temperature of about 135° to about 145° C. to form a supersaturated solution of carotene-in-oil, emulsifying while warm said supersaturated solution in 1 to 6 parts by weight of an aqueous gelatin-sugar solution, spraying the emulsion in the form of small droplets, said droplets comprising a supersaturated carotene-in-oil solution emulsified in the gelatin-sugar solution, and setting said droplets as dry beadlets by collecting them in a starchy collecting powder.

11. A process which comprises dissolving 7 to 17% by weight of carotene in an edible vegetable oil which is liquid at about room temperature and which has been heated to a temperature of about 135° to about 145° C. to form a supersaturated solution of carotene-in-oil, emulsifying while warm said supersaturated solution in 1 to 6 parts by weight of an aqueous gelatin-sugar solution, spraying the emulsion in the form of small droplets into a heated chamber thereby setting said droplets in dry, particulate form.

12. A dry, water-dispersible coloring composition comprising a supersaturated solution of a carotenoid in an edible oil which is liquid at about 20° to about 40° C., said supersaturated solution of carotenoid-in-oil being dispersed in a gelable colloid and set in dry, particulate form.

13. A dry, water-dispersible coloring agent comprising a supersaturated solution of carotene in an edible oil which is liquid at about 20° to about 40° C., said supersaturated solution of carotenoid-in-oil being dispersed in a gelable colloid and set in dry, particulate form.

14. A composition as in claim 13 wherein the edible oil is vegetable oil and the gelable colloid is gelatin.

15. A dry, water-dispersible coloring agent comprising a supersaturated solution of lycopene in an edible oil which is liquid at about 20° to about 40° C., said supersaturated solution of lycopene-in-oil being dispersed in a gelable colloid and set in dry, particulate form.

16. An emulsion comprising a supersaturated solution of carotenoid in an edible oil which is normally liquid at room temperature, said supersaturated solution being dispersed in an aqueous gelable colloid solution.

17. An emulsion comprising a supersaturated solution containing 1% to 17% by weight of carotene in an edible vegetable oil which is normally liquid at room temperature, said supersaturated solution being dispersed in an aqueous gelatin solution.

References Cited in the file of this patent

UNITED STATES PATENTS

| | | |
|---|---|---|
| 1,201,133 | Askenasy | Oct. 10, 1916 |
| 2,535,538 | Koch | Dec. 26, 1950 |
| 2,702,262 | Bavley et al. | Feb. 15, 1955 |
| 2,756,177 | Cannalonga et al. | July 24, 1956 |